United States Patent
Bloom

(10) Patent No.: US 11,257,343 B2
(45) Date of Patent: Feb. 22, 2022

(54) CHILD MONITORING SYSTEM AND METHOD FOR REAL-TIME MONITORING OF A CHILD

(71) Applicant: THE BRAZEN CORPORATION, New York, NY (US)

(72) Inventor: Marcy Bloom, New York, NY (US)

(73) Assignee: The Brazen Corporation, New York, NY (US)

( * ) Notice: Subject to any disclaimer, the term of this patent is extended or adjusted under 35 U.S.C. 154(b) by 0 days.

(21) Appl. No.: 16/812,288

(22) Filed: Mar. 7, 2020

(65) Prior Publication Data

US 2020/0286354 A1 Sep. 10, 2020

Related U.S. Application Data

(60) Provisional application No. 62/815,489, filed on Mar. 8, 2019.

(51) Int. Cl.
*G08B 21/02* (2006.01)

(52) U.S. Cl.
CPC ..... *G08B 21/0208* (2013.01); *G08B 21/0269* (2013.01); *G08B 21/0288* (2013.01)

(58) Field of Classification Search
CPC ............ G08B 21/0208; G08B 21/0269; G08B 21/0288; G08B 21/0291; G08B 21/028; B60N 2/2848; A61B 5/7275; A61B 5/4809
See application file for complete search history.

(56) References Cited

U.S. PATENT DOCUMENTS

| | | | |
|---|---|---|---|
| 5,689,240 A | 11/1997 | Traxler | |
| 5,900,817 A | 5/1999 | Olmassakian | |
| 6,396,403 B1 | 5/2002 | Haner | |
| 8,659,421 B2 | 2/2014 | Babineau | |
| 9,173,087 B2 | 10/2015 | Britt et al. | |
| 9,792,799 B2 | 10/2017 | Pallotta | |
| 2010/0117821 A1 | 5/2010 | Cruz | |
| 2013/0107029 A1* | 5/2013 | Knasel | H04N 7/181 348/77 |
| 2014/0015971 A1* | 1/2014 | DeJuliis | H04N 7/181 348/148 |

(Continued)

*Primary Examiner* — An T Nguyen
(74) *Attorney, Agent, or Firm* — Kanika Radhakrishnan; Evergreen Valley Law Group

(57) ABSTRACT

A method and system for real-time monitoring of a child held in a child holding object is disclosed. The location tracking system includes child holding object and monitoring device. The child holding object is configured to hold child and includes a mounting space. The monitoring device is configured to be mounted on mounting space. The monitoring device includes mobile camera, modem device, global positioning system (GPS) module and plurality of sensors. The mobile camera is configured to capture and transmit live video stream to continuously track and monitor activities of child held in child holding object. The modem device enables communication between monitoring device and at least one user device over network. The GPS module determines location information of the monitoring device mounted on child holding object by determining GPS coordinates of monitoring device. The plurality of sensors detects change in position of the child seated in child holding object.

20 Claims, 13 Drawing Sheets

(56) References Cited

U.S. PATENT DOCUMENTS

| | | | |
|---|---|---|---|
| 2015/0094544 A1* | 4/2015 | Spolin | A61B 5/7275 |
| | | | 600/301 |
| 2015/0109126 A1 | 4/2015 | Crawford | |
| 2015/0302721 A1 | 10/2015 | Schmidt | |
| 2019/0293801 A1* | 9/2019 | Kelley | G01C 21/20 |
| 2020/0023755 A1* | 1/2020 | Chiesa | B60N 2/2845 |
| 2020/0111339 A1* | 4/2020 | Holt | G08B 21/0476 |

* cited by examiner

CHILD MONITORING SYSTEM AND METHOD FOR REAL-TIME MONITORING OF A CHILD

TECHNICAL FIELD

The present disclosure relates to a child monitoring system and, more particularly to, a method and a system for real-time monitoring of a child held in a child holding object, such as a car seat and a stroller.

BACKGROUND

Children, especially infants and toddlers require constant attention from their caregivers. Today's demanding lifestyle requires caregivers to perform various mundane everyday tasks outdoors. As a result, young children spend a lot of time being driven around either in the vehicles or in the strollers. As a practice of safety, children are usually strapped to either a child safety seat in the vehicle or placed in the stroller.

It is a well-known fact that most of the young children do not remain seated for long without becoming restless or agitated. Many children try to climb out of their seat or may begin to yell and scream. A wandering or a lost child is a caregiver's greatest fear, and it requires the caregiver to remain alert all the time to ensure that the child is unhurt. This sometimes becomes stressful for the caregiver as the caregiver has to simultaneously manage the children and other tasks.

In light of the above discussion, there is a need for a method and a system to enable the caregivers to monitor their children in real-time thereby making sure that the children are safe and comfortable.

SUMMARY

Various embodiments of the present disclosure provide a system and a method for real-time monitoring of a child held in a child holding object, such as a stroller and a child safety seat.

In an embodiment, a child monitoring system is disclosed. The location tracking system includes a child holding object and a monitoring device. The child holding object is configured to hold a child and includes a mounting space. The monitoring device is configured to be mounted on the mounting space. The monitoring device comprises a mobile camera, a modem device, a global positioning system (GPS) module and a plurality of sensors. The mobile camera is configured to capture and transmit a live video stream to continuously track and monitor activities of a child held in the child holding object. The modem device enables communication between the monitoring device and at least one user device over a network. The GPS module determines location information of the monitoring device mounted on the child holding object by determining GPS coordinates of the monitoring device. The plurality of sensors detects change in position of the child seated in the child holding object.

In another embodiment, a child monitoring system is disclosed. The child monitoring system includes a stroller and a monitoring device. The stroller is configured to hold a child and includes a mounting space therein. The monitoring device is configured to be mounted on the mounting space. The monitoring device comprises a mobile camera, a modem device, a global positioning system (GPS) module and a plurality of sensors. The mobile camera is configured to capture and transmit a live video stream to continuously track and monitor activities of a child held in the stroller. The modem device enables communication between the monitoring device and at least one user device over a network. The GPS module determines location information of the monitoring device mounted on the child holding object by determining GPS coordinates of the monitoring device. The plurality of sensors detects change in position of the child held in the stroller.

In yet another embodiment, a method for real-time monitoring of a child held in a child holding object is disclosed. The method includes receiving monitoring device data captured in real-time by a monitoring device mounted on the child holding object. The monitoring device data includes a live video stream of the child seated in the child holding object, location information associated with the child holding object, and sensor data captured by a plurality of sensors included in the monitoring device. The method includes analyzing the monitoring device data to determine if one or more alarming conditions exist. The one or more alarming conditions are predefined. The method includes generating one or more alerts for a user upon determining that the one or more alarming condition exists. The method further includes facilitating display of the monitoring device data in real-time and the one or more alerts on a user interface (UI) of a display screen of a user device.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
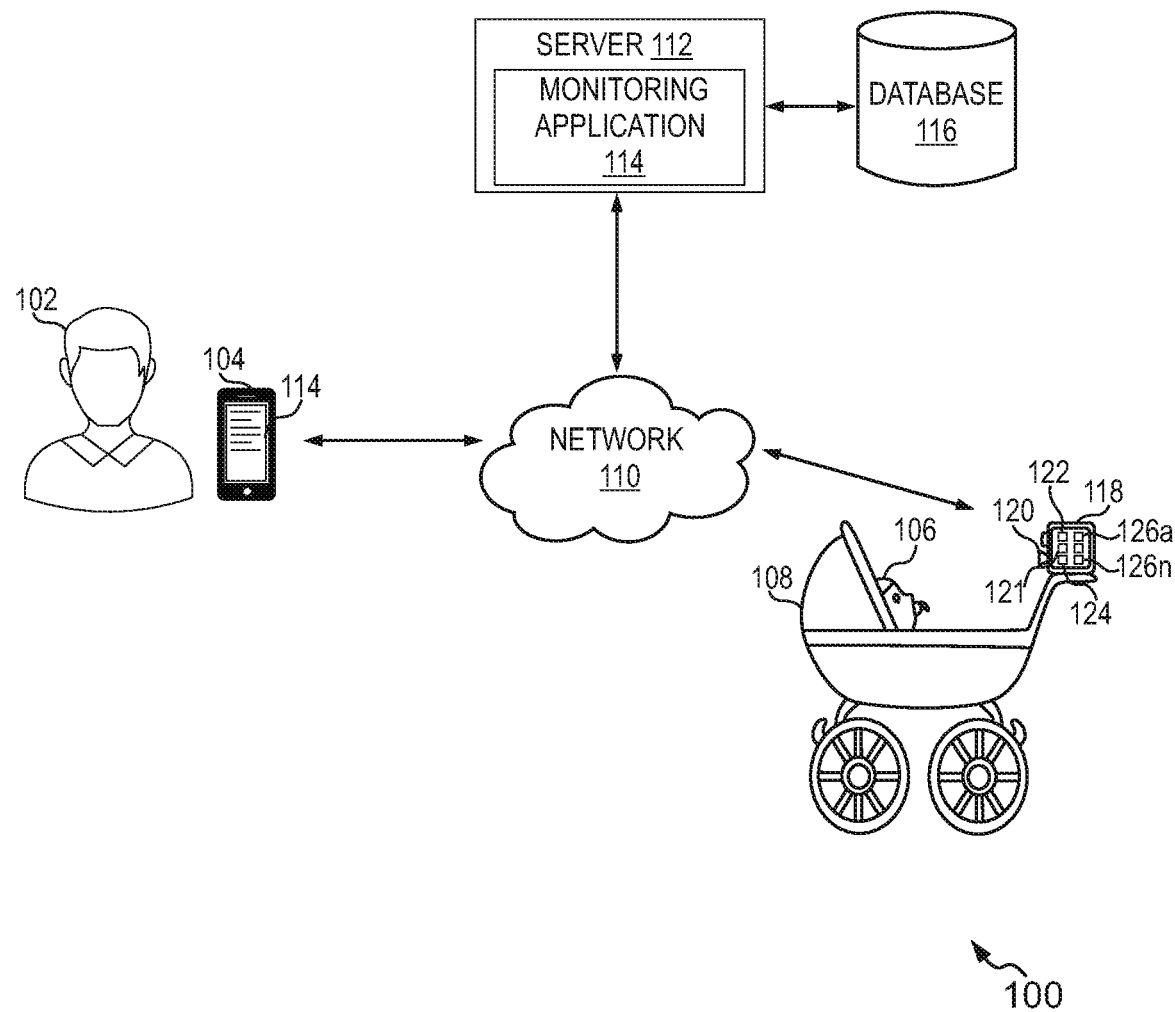
FIG. 1 illustrates an environment, where at least some example embodiment can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

In an example scenario, a caregiver is responsible for looking after a child held in a child holding object, such as a stroller or a car seat. The caregiver gets busy in some household work and the child held in the child holding object has fallen down from the child holding object and is badly hurt.

To address the challenges in the above scenario, various example embodiments of the present disclosure provide a method and system for real-time monitoring of a child held in a child holding object. A monitoring device is configured to be mounted on a mounting space provided in the child holding object. The monitoring device includes a mobile camera, a microphone, a modem device, a global positioning system (GPS) module, a plurality of sensors and a wirelessly chargeable battery. The mobile camera is configured to capture and transmit a live video stream to continuously track and monitor activities of the child held in the child holding object. The microphone is configured to record audio associated with the recorded live video stream. The modem device is configured to enable communication between the monitoring device and a user device over a network. The GPS module is configured to determine location information of the monitoring device mounted on the child holding object by determining GPS coordinates of the monitoring device. The location information can also be determined based on a plurality of satellite signals received from one or more satellites such as reliable positioning systems like GPS, GNSS, Galileo, GLONASS, LORAN, BeiDOU, NAVIC, QZSS or any other systems. The plurality of sensors is configured to detect a change in a position of the child seated in the child holding object.

A caregiver device is a mobile device equipped with a monitoring application and is communicably coupled to the monitoring device. The monitoring application is accessed to establish a connection with the monitoring device mounted on the child holding object. Once the connection is established between the monitoring application and the monitoring device, the monitoring device may start sending monitoring device data captured by the monitoring device to the monitoring application. The monitoring application is configured to display a live video stream along with audio and location information associated with the monitoring device. The live video stream may help the caregiver in monitoring activities of the child while the caregiver is still busy in some other work. The location information of the monitoring device is displayed on a map provided in a UI of the caregiver device via the monitoring application. The location information may also be displayed as geo-coordinates on the monitoring application. The monitoring application is also configured to generate and display one or more alerts upon determining one or more alarming conditions in the monitoring device data. The one or more alarming conditions are predefined in a child monitoring system. Examples of the one or more alarming conditions include, but are not limited to, the child holding object has left home geo-fence, the child holding object is in motion, the child is in the child holding object, the child is not in the child holding object, the child is crying, the child is sleeping and change in position of the child held in child holding object. The wirelessly chargeable battery is configured to wirelessly charge the battery in the location tracking device using at least one of inductive charging, magnetic resonance charging, radiofrequency charging and ultrasonic sound wave charging.

The terms 'user' and 'caregiver' have been used interchangeably throughout the description and refer to a person who is responsible for looking after a child held in a child holding object.

The real-time monitoring of a child held in a child holding object using the child monitoring system is further explained in detail with reference to FIGS. 1-10.

FIG. 1 shows an example representation of an environment 100 in which various embodiments of the present invention may be practiced. The environment 100 includes a wireless communication network (e.g., a network 110) that connects entities such as, a user 102 (hereinafter referred to as a 'caregiver 102'), a monitoring device 118 mounted on a mounting space (e.g., configured within a handle) of a child holding object such as a stroller 108 and a server 112. The child holding object is shown as the stroller 108 for the explanation purpose only and the child holding object is not limited to the stroller. The caregiver 102 is depicted to be associated with an electronic device 104 (hereinafter referred to as 'caregiver device 104'). It should be noted that one caregiver device 104 is shown for the sake of simplicity, there can be a number of caregiver devices. The caregiver 102 is responsible for looking after a child 106 who is held in the stroller 108.

In at least one example embodiment, the caregiver device 104 is equipped with a monitoring application 114 that facilitates real-time monitoring of a child (e.g., the child 106) held in a child holding object, such as the stroller 108. The caregiver device 104 may be any communication device having hardware components for enabling User Interfaces (UIs) of the monitoring application 114 to be presented on the caregiver device 104. The caregiver device 104 may be capable of being connected to a wireless communication network (such as the network 110). Examples of the caregiver device 104 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

In an embodiment, the caregiver 102 may access the monitoring application 114 for viewing a real-time live video stream of the child 106 held in the stroller 108. The monitoring application 114 may enable the caregiver 102 to view recordings of the live video streams which are captured previously by the monitoring device 118 mounted on the stroller 108. The monitoring application 114 may also enable the caregiver 102 to view one or more alerts raised by the monitoring application 114 in case one or more alarming conditions are observed by the monitoring device 118. Examples of the alarming conditions that can be detected by the monitoring device 118 include, but are not limited to, stroller 108 has left home geo-fence, stroller 108 is in motion, the child 106 is in the stroller 108, the child 106 is not in the stroller 108 and change in position of the child 106 held in the stroller 108.

In an embodiment, the server 112 provides a software application, herein referred to as the monitoring application 114, in response to a request received from at least one user device such as the caregiver device 104 (associated with the caregiver 102) via the network 110. Examples of the network 110 include stand-alone or a combination of a local area network (LAN), a wide area network (WAN), wireless, wired, any currently existing or to be developed network that can be used for communication. In some implementations, the network 110 includes various cellular data networks such as 2G, 3G, 4G, and others. More specifically, an example of the network 110 can be the Internet which may be a combination of a plurality of networks and may accommodate many different communications media and protocols. In an embodiment, the monitoring application 114 may be factory-installed on the caregiver device 104 and the caregiver device 104 may need not specifically request the monitoring application 114 from the server 112. In another embodiment, the caregiver device 104 may access an instance of the monitoring application 114 from the server 112 for installing on the caregiver device 104 using application stores associated with Apple iOS™ Android™ OS, Google Chrome OS, Symbian OS®, Windows Mobile® OS, Windows Phone, BlackBerry® OS, Embedded Linux, web OS, Palm OS® or Palm Web OS™, and the like.

In an embodiment, the monitoring device 118 includes a mobile camera 120 that is directed in such a way that it captures a view of a child (e.g., the child 106) who is being carried in a child holding object (e.g., the stroller 108) and a microphone 121. The mobile camera 120 is configured to capture and transmit a live video stream to continuously track and/or monitor activities of the child 106 carried in the stroller 108. The microphone 121 is configured to record audio associated with the live video stream. In an embodiment, the microphone 121 is an in-built microphone. In another embodiment, the microphone 121 is an external microphone. The monitoring device 118 also includes a modem device 122 for enabling communication between the monitoring device 118 and at least one user device (e.g., the caregiver device 104) over a network (e.g., the network 110). The monitoring device 118 further includes a global positioning system (GPS) module 124 for determining and sharing location information of the monitoring device 118 mounted on the stroller 108. The GPS module 124 is configured to determine GPS coordinates of the monitoring device 118 to enable continuous tracking of a location of the child 106 held in the stroller 108. Additionally, the monitoring device 118 includes a plurality of sensors 126a to 126n for detecting a change in position of the child 106 carried in the stroller 108. The plurality of sensors 126a to 126n include, but are not limited to, an accelerometer, a gyro-meter, a magnetometer, a capacitive sensor, a Doppler Effect sensor, an eddy-current sensor, an inductive sensor, a laser rangefinder sensor, a magnetic sensor, an optical sensor, a thermal infrared sensor, a photocell sensor, a radar sensor, an ionizing radiation reflection sensor, a sonar sensor, an ultrasonic sensor, a fiber optics sensor or any other proximity sensors.

In at least one example embodiment, the monitoring application 114 is configured to stream live video captured by the mobile camera 120 included in the monitoring device 118 along with audio associated with the streamed live video. The live video is helpful in continuously tracking and/or monitoring activities of the child 106 being carried in the stroller 108. The monitoring application 114 is also configured to generate and display alerts in case some alarming conditions being observed by the monitoring device 118. In an embodiment, the alarming conditions are determined by analyzing monitoring device data provided by the monitoring device 118. The monitoring device data includes data captured by the monitoring device 118, such as live video stream captured by the mobile camera, audio recorded for the live video stream, location information determined by the GPS module and sensor data provided by the plurality of sensors. For example, motion of the stroller 108 is an alarming condition that can be detected by comparing image frames transmitted by the mobile camera 120 of the monitoring device 118. When images differ by a certain threshold, motion is detected and an alert is generated and displayed on the monitoring application 114. The motion of the stroller 108 can also be detected by comparing GPS coordinates and an alert can be generated and displayed on the monitoring application 114. Further, the monitoring application 114 is configured to display history information of the monitoring device 118. The history information includes saved one or more live video streams which are recorded by the mobile camera 120, saved audio recorded for the one or more live video streams, saved location information associated with the monitoring device 118 that are previously captured by the GPS module 124 and one or more alerts that are generated by the monitoring application 114.

In an embodiment, a server 112 is configured to receive monitoring device data which includes real-time live video stream, audio recorded for the live video stream, location information and sensor data captured by the monitoring device 118 and to analyze the monitoring device data for generating alerts based on results of the analysis performed on the monitoring device data. The server 112 is also configured to display the live video stream, the location information and generated alerts on the monitoring application 114. The server 112 may be located in one place or maybe distributed at multiple locations. Alternatively, or additionally, the server 112 can be a remote server, such as a cloud-based server. In another embodiment, the monitoring device 118 may provide the monitoring device data directly to the caregiver device 104 via the monitoring application 114.

The monitoring application 114 may be an application resting at the server 112. In an embodiment, the server 112 is configured to host and manage the monitoring application 114 and communicates with a user device, such as the caregiver device 104 using the network 110. The monitoring application 114 may be accessed through the web via the network 110. In an embodiment, monitoring application 114 may be accessed through the web using the Internet.

Figure 10:
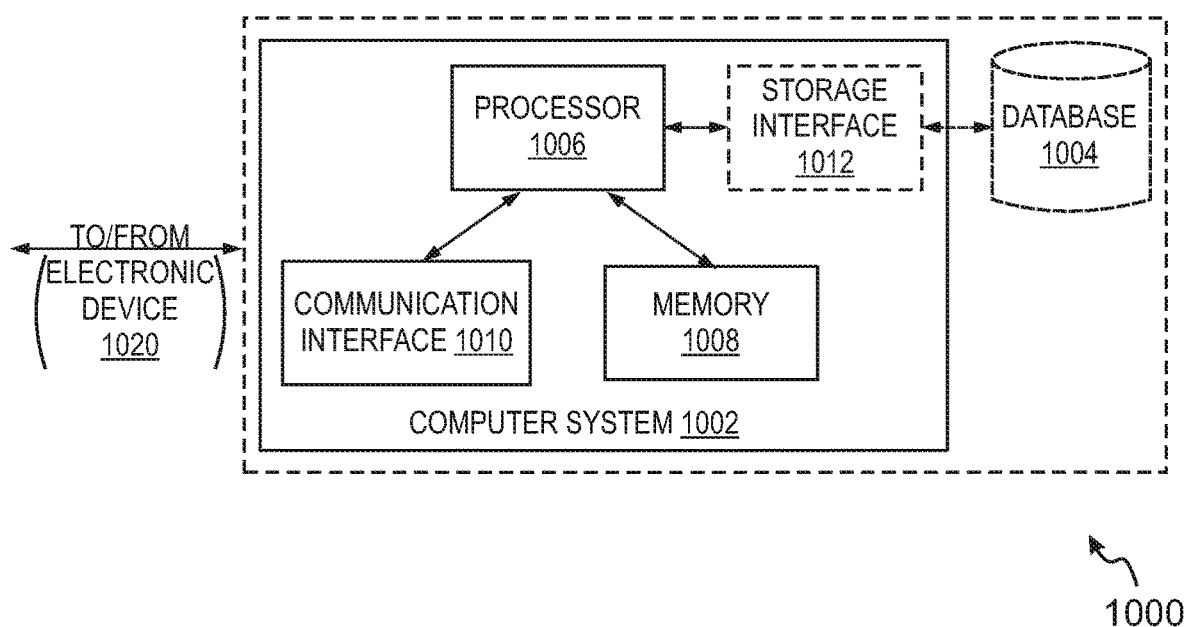
FIG. 10 is a simplified block diagram of a server of FIG. 1, in accordance with an example embodiment.

It is noted that the instructions (or the executable code) configuring the monitoring application 114 are stored in a memory of the server 112, and the instructions are executed by a processor (for example, a single-core or a multi-core processor) included within the server 112, as is exemplarily shown with reference to FIG. 10. Accordingly, even though the various functionalities for real-time monitoring of a child carried in a child holding object are explained with reference to or being performed by the monitoring application 114, it is understood that the processor in conjunction with the code in the memory is configured to execute the various tasks as enabled by the instructions of the monitoring application 114.

Figure 2:
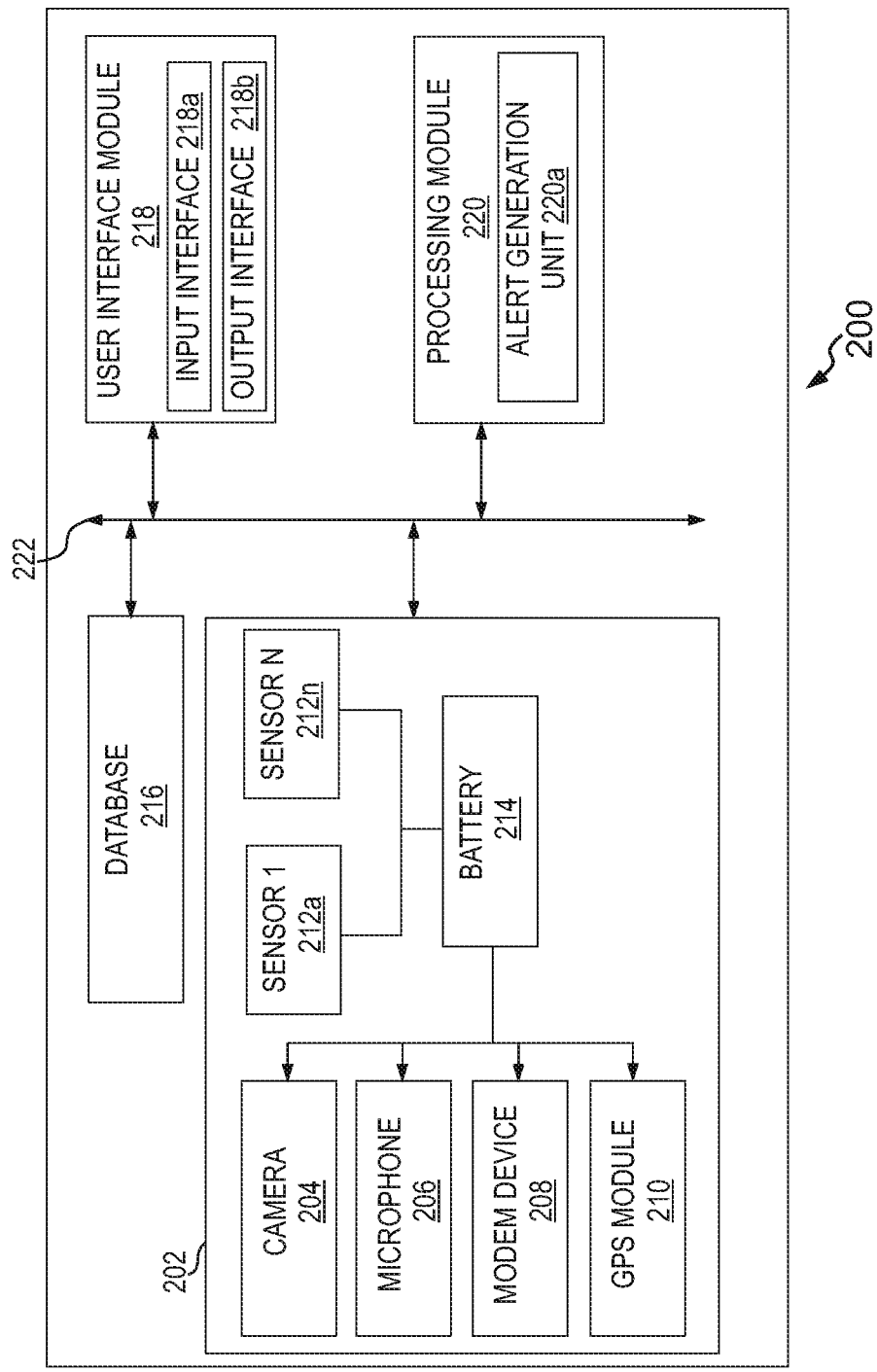
FIG. 2 is a block diagram of a child monitoring system for real-time monitoring of a child carried in a child holding object, in accordance with an example embodiment.

FIG. 2 is a block diagram of a child monitoring system 200 for real-time monitoring of a child carried in a child holding object, in accordance with an example embodiment. The child monitoring system 200 may be embodied in a server, such as the server 112 or electronic device, such as the caregiver device 104. The child monitoring system 200 enables a user (e.g., the caregiver 102) to perform real-time monitoring of a child (e.g., the child 106) held in a child holding object (e.g., the stroller 108). In an embodiment, the child monitoring system 200 includes a monitoring device 202, database 216, a user interface (UI) module 218, a processing module 220 and a centralized circuit system 222.

In an embodiment, the monitoring device 202 is mounted on a mounting space of a child holding object which may be used to carry a child. The monitoring device 202 is configured to track activities of the child being carried in the child holding object in real-time. For performing tracking, the monitoring device 202 includes a camera 204, a microphone 206, a modem device 208, a GPS module 210, a plurality of sensors 212a to 212n and a battery 214.

The camera 204 is configured to capture and transmit a live video stream to continuously track and monitor activities of the child seated in the child holding object. In an embodiment, the camera 204 can be any camera that can capture a live video stream. Examples of the camera 204 include, but are not limited to, a video camera, a camcorder, a closed-circuit television camera, a webcam, and a smartphone camera. The microphone 206 is configured to record audio associated with the live video stream. In an embodiment, the microphone 206 is an in-built microphone that is in-built in the camera 204. In another embodiment, the microphone 206 is an external microphone.

The modem device 208 is configured to enable communication between the monitoring device 202 and at least one user device (e.g., the caregiver device 104) over a network (e.g., the network 110). The modem device 208 is configured to enable communication between the monitoring device 202 and the server 112. The GPS module 210 is configured to determine the global positioning system coordinates of the monitoring device 202. The GPS module 210 may determine the global position of the monitoring device 202 attached to the child holding object at any given time from any given place which may help in continuously tracking and/or monitoring location of the child seated in the child holding object, such as the stroller or a car seat.

The plurality of sensors 212a to 212n is configured to detect a change in the position of the child seated in the child holding object. The plurality of sensors 126a to 126n include, but are not limited to, an accelerometer, a gyrometer, a magnetometer, a capacitive sensor, a Doppler Effect sensor, an eddy-current sensor, an inductive sensor, a laser rangefinder sensor, a magnetic sensor, an optical sensor, a thermal infrared sensor, a photocell sensor, a radar sensor, an ionizing radiation reflection sensor, a sonar sensor, an ultrasonic sensor, a fiber optics sensor or any other proximity sensors.

The battery 214 is a wirelessly chargeable battery and is configured to provide the power required for operating the monitoring device 202. In an example, the battery 214 meets the power requirements of the camera 204, the microphone 206, the modem device 208, the GPS module 210, and the plurality of sensors 212a to 212n. The battery 214 can be recharged wirelessly. In an embodiment, the battery 214 comprises a Qi charging coil for wirelessly charging the battery 214 via inductive charging. Alternatively, the battery 214 uses at least one of a magnetic resonance charging, a radio frequency charging, an ultrasonic sound wave charging or any other wireless charging technique known in the art, for wirelessly charging the battery 214.

In an embodiment, the database 216 is configured to store monitoring device data captured by the monitoring device 202. The monitoring device data which is stored in the database 216 includes history information of the monitoring device 202. The history information includes saved one or more live video streams which are recorded by the camera 204, saved audio recorded for the one or more live video streams, saved location information associated with the monitoring device 202 that are previously captured by the GPS module 210 and one or more alerts that are generated by the child monitoring system 200.

The user interface module 218 is in communication with the database 216. The user interface module 218 is configured to present one or more UIs for real-time monitoring of the child held in the child holding object. The UI module 218 includes an input interface 218a and an output interface 218b. The input interface 218a is configured to receive inputs for setting one or more parameters of the camera 204. The one or more parameters include focus, angle of view, intensity, mode etc. The input interface 218a is also configured to receive network setting for connecting the monitoring device 202 with a communication network (e.g., the network 110). Examples of the input interface 218a may include, but are not limited to, a keyboard, a mouse, a joystick, a keypad, a touch screen, soft keys, a floppy disk, a pen drive, a hard drive and the like. The output interface 218b is configured to display the UIs for facilitating real-time monitoring of the child held in the child holding object. In an embodiment, the output interface 218b is configured to display a live video stream captured by the camera in real-time. The output interface 218b is also configured to display a current location of the monitoring device 202. In an embodiment, the current location of the monitoring device 202 is displayed on a map. In another embodiment, the current location of the monitoring device 202 is displayed as location coordinates. Further, the output interface 218b is configured to display one or more alerts generated by the child monitoring system 200. Additionally, the output interface 218b is configured to display history information of the monitoring device 202. Examples of the output interface 218b may include, but are not limited to, a display such as a light emitting diode (LED) display, a thin-film transistor (TFT) display, a liquid crystal display, an active-matrix organic light-emitting diode (AMOLED) display, and the like.

The processing module 220 is configured to coordinate with the monitoring device 202, the database 216 and the UI module 218 of the child monitoring system 200 for the operation of the various components of the child monitoring system 200. In an embodiment, the processing module 220 includes an alert generation unit 220a. The alert generation unit 220a is configured to analyze the monitoring device data received from the monitoring device 202, to generate one or more alerts based on results of the analysis performed on the monitoring device data and to communicate information about the generation of the one or more alerts. The one or more alerts are generated upon detecting one or more alarming conditions in the monitoring device data. In an embodiment, the one or more alarming conditions are predefined by an administrator of the monitoring application 114. Examples of the one or more alarming conditions include, but are not limited to, the child holding object has left home geo-fence, the child holding object is in motion, the child is in the child holding object, the child is not in the child holding object, the child is crying, the child is sleeping and change in position of the child held in child holding object. For example, upon analyzing the monitoring device data it is determined that the monitoring device is not in a home location as the location information received from the monitoring device is showing some other location, an alert may be generated by the alert generation unit 220a and the information about the generation of the alert may be shared with the UI module 218. The UI module 218 may display the alert to a user (e.g., the caregiver 102) associated with an electronic device (e.g., the caregiver device 104) equipped with the monitoring application 114.

Figure 3:
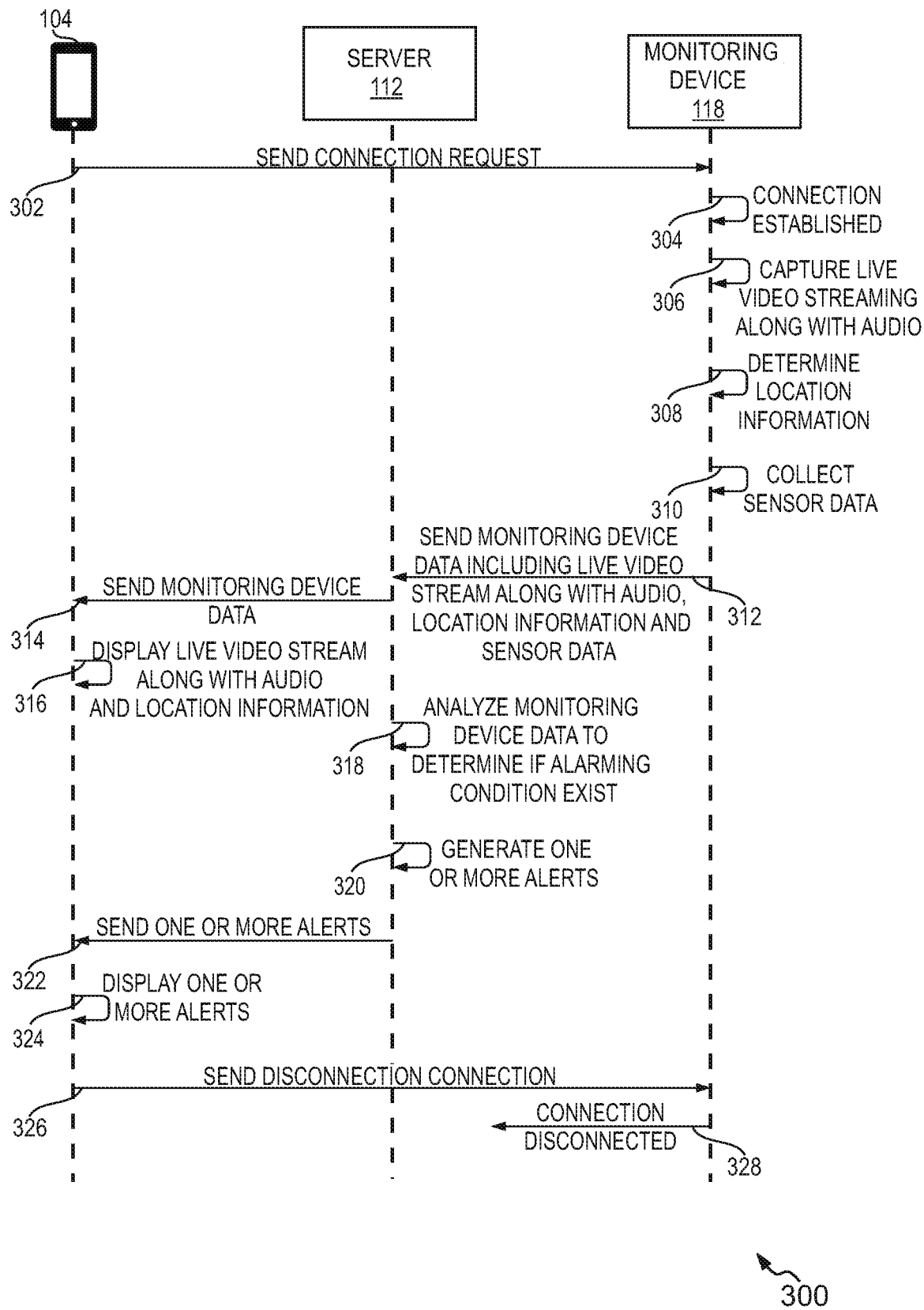
FIG. 3 is a flow diagram for real-time monitoring of the child held in the child holding object in which a monitoring device is mounted, in accordance with an example embodiment.

FIG. 3 is a flow diagram 300 for real-time monitoring of a child held in a child holding object in which the monitoring device 118 of FIG. 1 is mounted, in accordance with an example embodiment. The sequence of operations of the flow diagram 300 need not be necessarily executed in the same order as they are presented. Further, one or more operations may be grouped together and performed in the form of a single step, or one operation may have several sub-steps that may be performed in parallel or in a sequential manner.

At operation 302, the caregiver device 104 sends a connection request to establish a connection with the monitoring device 118 mounted on the child holding object (e.g., the stroller 108) in which a child (e.g., the child 106) to be monitored is held. At operation 304, the connection is established between the caregiver device 104 and the monitoring device 118. In an example, if a caregiver (e.g., the caregiver 102) is busy in doing in some household work in kitchen of a house and the child is held in the child holding object placed in a living room of the house, then the caregiver associated with the caregiver device 104 can accesses a monitoring application, such as, the monitoring application 114 installed in the caregiver device 104 to see activities of the child held in the child holding object if the caregiver device 104 and the monitoring device 118 mounted on the child holding object are connected. In an embodiment, the monitoring application 114 may present one or more UI's on the caregiver device 104 displaying real-time live stream video of the child along with a map showing current location of the child.

At operation 306, once the connection is established, the monitoring device 118 starts capturing live video stream along with audio using the mobile camera 120 and microphone 121 included in the monitoring device 118. At operation 308, the monitoring device 118 determines location information associated with the monitoring device 118 by determining global positioning system (GPS) coordinates of the monitoring device 118 attached to the child holding object, such as stroller/child safety seat to be monitored using the GPS module 124 included in the monitoring device 118.

At operation 310, the monitoring device 118 starts collecting sensor data from the plurality of sensors 126a to 126n included in the monitoring device 118. At operation 312, the monitoring device 118 sends monitoring device data to the server 112. The monitoring device data includes captured live video stream along with audio, location information determined by the GPS module 124 and the sensor data provided by the plurality of sensors 126a to 126n.

At operation 314, the server 112 analyzes the monitoring device data and sends the monitoring device data to the caregiver device 104. The analysis step is explained with reference to operation 318. At operation 316, the caregiver device 104, upon receiving the monitoring device data, displays the live video stream along with the audio and location information. In an embodiment, the location information is displayed on a map. In another embodiment, the location information is displayed as location coordinates.

At operation 318, the server 112 analyzes the monitoring device data to determine whether any alarming condition exists in the monitoring device data. If one or more alarming conditions are found to be present in the monitoring device data, operation 320 is performed else operation 326 is performed.

At operation 320, the server 112 generates one or more alerts based on the one or more alarming conditions. At operation 322, the server 112 sends the generated one or more alerts to the caregiver device 104. At operation 324, the caregiver device 104 displays the one or more alerts.

At operation 326, the caregiver device 104 sends a disconnection request to the monitoring device 118 if the caregiver 102 no longer wants to monitor the child 106. At operation 328, the monitoring device 118 disconnects the connection with the caregiver device 104 and the monitoring device 118 enters in an exit mode. The exit mode is explained in detail with reference to FIG. 5D.

In some example embodiments, the server 112 may not be needed, and the caregiver device 104 and the monitoring device 118 can directly communicate with each other.

Figure 4:
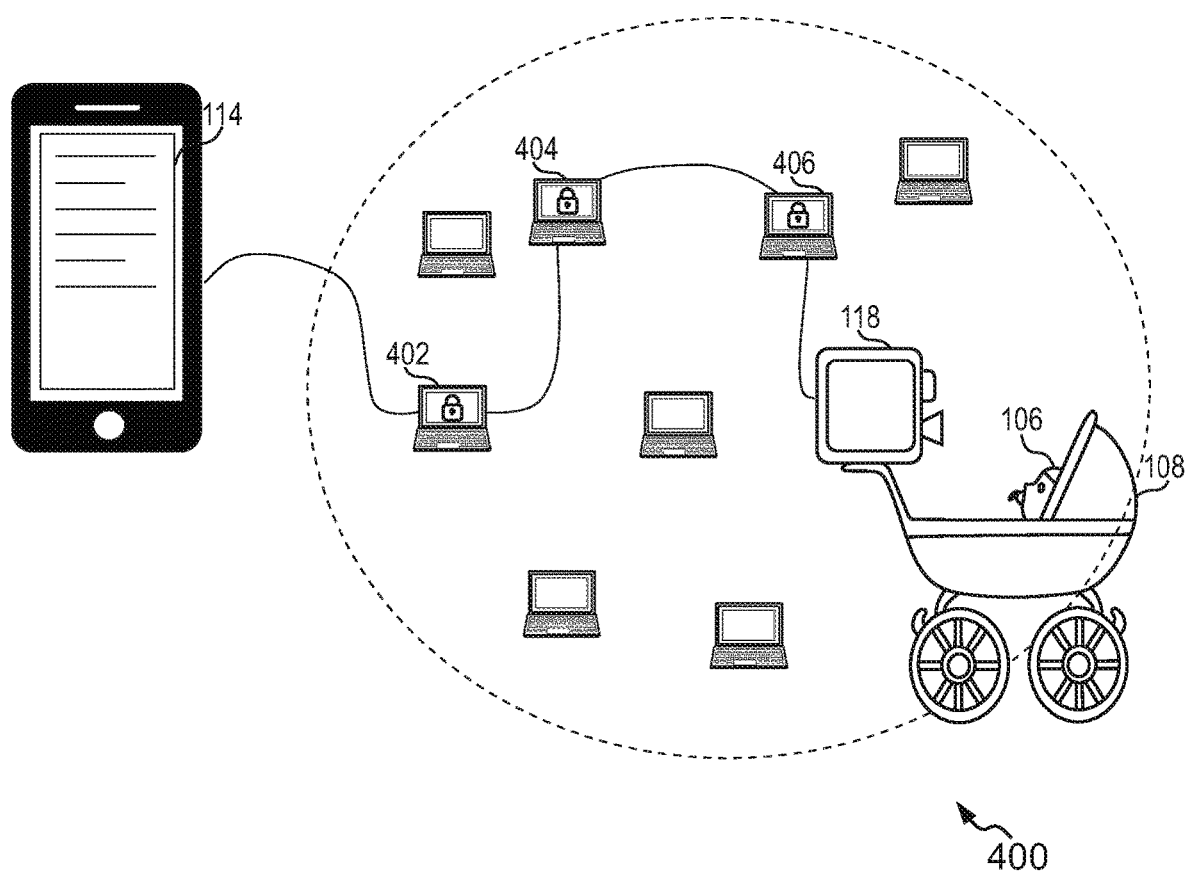
FIG. 4 is a schematic representation of modes of operation of a monitoring application in communication with the monitoring device mounted on the child holding object, in accordance with an example embodiment.

FIG. 4 is a schematic representation 400 of modes of operation of the monitoring application 114 in communication with the monitoring device 118 mounted on the child holding object (e.g., the stroller 108), in accordance with an example embodiment. The monitoring application 114 can be launched by a user (e.g., the caregiver 102) using a user device (e.g., the caregiver device 104) in a particular mode of operation from available modes of operation based on a context in which a request to launch the monitoring application 114 is received. The available modes of operation of the monitoring application 114 include an init mode (not shown in FIG. 4), an entry mode, a relay mode and an exit mode. Each mode in the available modes of operation is associated with a state of processing the monitoring application 114. For example, if the user is connecting the monitoring application 114 with the monitoring device 118 for the first time, then the monitoring application 114 may be launched in the init mode of operation. In the init mode of operation, a user interface (UI) asking for Bluetooth/Wireless Fidelity (WiFi) credentials may be displayed to the user as the Bluetooth/WiFi credentials are mandatory for connecting the monitoring application 114 with the monitoring device 118 for the first time.

As shown in FIG. 4, the representation 400 includes the entry mode 402, the relay mode 404 and the exit mode 406. In the entry mode 402, the monitoring device 118 connects with the monitoring application 114 to transmit location information of the monitoring device 118 and to initiate live video streaming. In the relay mode 404, the monitoring application 114 enables the user to adjust settings of the video stream. For example, a UI corresponding to settings page may be displayed to the user for enabling the user to adjust settings of the video stream by adjusting settings of the one or more parameters of the mobile camera 120 of the monitoring device 118. In the exit mode 406, the connection between the monitoring device 118 and the monitoring application 114 is released. In an embodiment, the connection between the monitoring device 118 and the monitoring application 114 is released based on a user request received from the user device. In an embodiment, the connection between the monitoring device 118 and the monitoring application 114 is released due to the unavailability of a network. However, the monitoring device 118 is capable of monitoring and functioning in an offline mode.

Figure 5A:
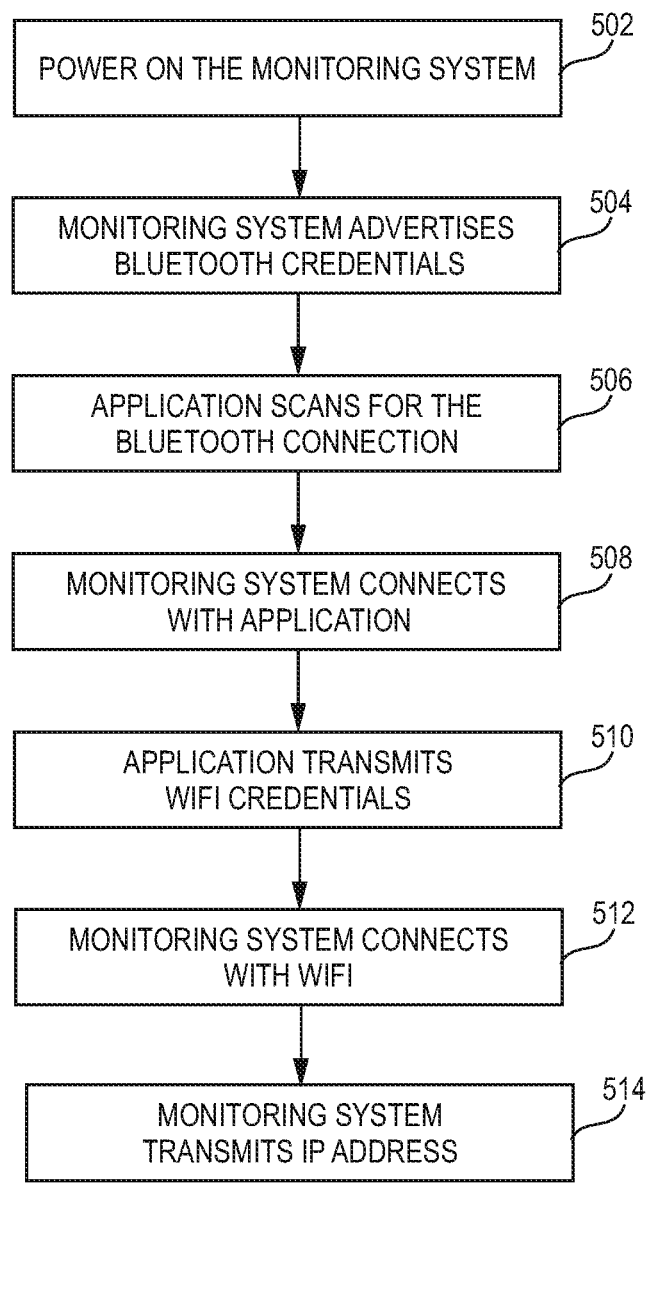
FIG. 5A is a flow diagram for operating the monitoring application in an init mode of operation, in accordance with an example embodiment.

FIG. 5A is a flow diagram 500 for operating the monitoring application 114 in the init mode of operation, in accordance with an example embodiment. The operations of the flow diagram 500 may be carried out by a server such as the server 112, the child monitoring system 200 or the electronic device 104. The sequence of operations of the flow diagram 500 may not be necessarily executed in the same order as they are presented. Further, one or more operations may be grouped together and performed in the form of a single step, or one operation may have several sub-steps that may be performed in parallel or in a sequential manner.

At operation 502, a monitoring device (e.g., the monitoring device 118) with which the monitoring application 114 wants to make a connection is powered on. At operation 504, the monitoring device advertises Bluetooth credentials that need to be scanned by the monitoring application 114 for making a connection. At operation 506, the monitoring application 114 scans the Bluetooth credentials advertised by the monitoring device. At operation 508, the monitoring device makes the connection with the monitoring application 114 upon successful scanning of the Bluetooth credentials.

At operation 510, the monitoring application 114 transmits the WiFi credentials to the monitoring device for connecting the monitoring device with the network, such as the Internet. At operation 512, the monitoring device gets connected with the network using shared WiFi credentials. At operation 514, the monitoring device transmits its Internet Protocol (IP) address to the monitoring application 114 and thus monitoring device can send the data to the monitoring application 114.

Figure 5B:
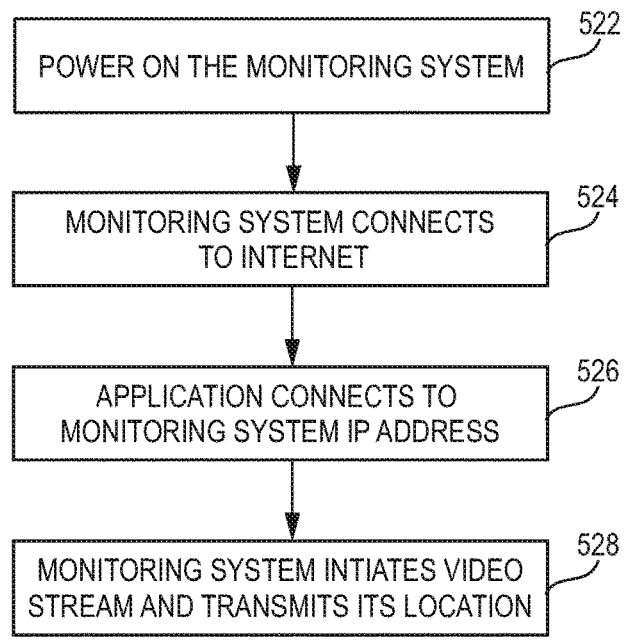
FIG. 5B is a flow diagram for operating the monitoring application in an entry mode of operation, in accordance with an example embodiment.

FIG. 5B is a flow diagram 520 for operating the monitoring application 114 in the entry mode of operation, in accordance with an example embodiment. The operations of the flow diagram 520 may be carried out by a server such as the server 112, the child monitoring system 200 or the electronic device 104. The sequence of operations of the flow diagram 520 may not be necessarily executed in the same order as they are presented. Further, one or more operations may be grouped together and performed in the form of a single step, or one operation may have several sub-steps that may be performed in parallel or in sequential manner.

At operation 522, a monitoring device (e.g., the monitoring device 118) with which the monitoring application 114 wants to make a connection is powered on. At operation 524, the monitoring device gets connected with the network as the network credentials are already available with monitoring device. At operation 526, the monitoring application 114 gets connected with the monitoring device using the IP address which is already available with the monitoring application 114. At operation 528, the monitoring device initiates real-time live video streaming and location information sharing.

Figure 5C:
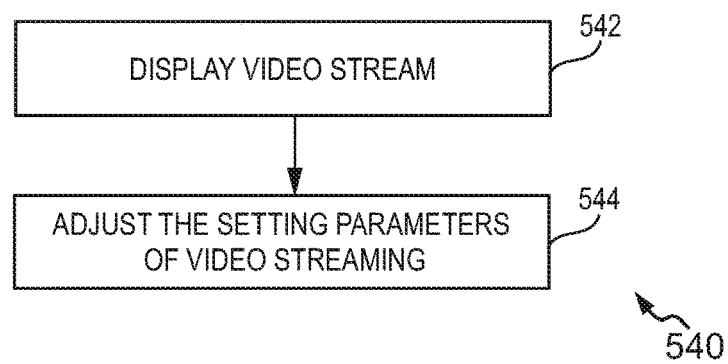
FIG. 5C is a flow diagram for operating the monitoring application in a relay mode of operation, in accordance with an example embodiment.

FIG. 5C is a flow diagram 540 for operating the monitoring application 114 in the relay mode of operation, in accordance with an example embodiment. The operations of the flow diagram 540 may be carried out by a server such as the server 112, the child monitoring system 200 or the electronic device 104. The sequence of operations of the flow diagram 540 may not be necessarily executed in the same order as they are presented. Further, one or more operations may be grouped together and performed in the form of a single step, or one operation may have several sub-steps that may be performed in parallel or in a sequential manner.

At operation 542, a live video stream is being displayed on the monitoring application 114. At operation 544, as the user is not liking a way the streaming of the video is being performed, the user adjusts one or more parameters associated with the video stream using the settings on the UI facilitated by the monitoring application 114. The user can adjust one or more parameters, such as focus, angle of view, intensity and mode of the streamed video and can modify the other general settings of the video, such as resolution, brightness, crop, store, download etc.

Figure 5D:
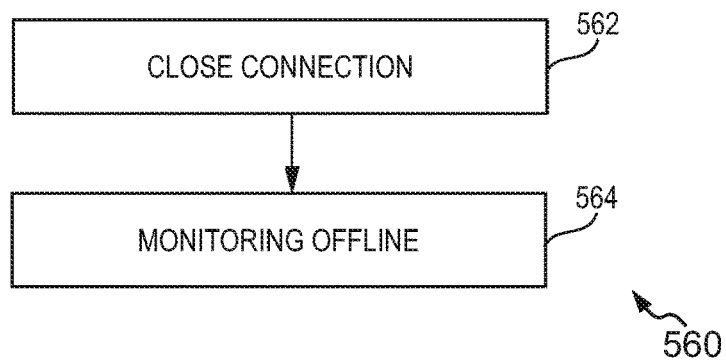
FIG. 5D is a flow diagram for operating the monitoring application in an exit mode of operation, in accordance with an example embodiment.

FIG. 5D is a flow diagram 560 for operating the monitoring application 114 in the exit mode of operation, in accordance with an example embodiment. The operations of the flow diagram 560 may be carried out by a server such as the server 112, the child monitoring system 200 or the electronic device 104. The sequence of operations of the flow diagram 560 may not be necessarily executed in the same order as they are presented. Further, one or more operations may be grouped together and performed in the form of a single step, or one operation may have several sub-steps that may be performed in parallel or in sequential manner.

At operation 562, a connection between the monitoring application 114 and the monitoring device is released/closed. In an embodiment, the connection is released based on a request received from the user for closing the connection. In another embodiment, the connection is released due to the unavailability of network. At operation 564, the monitoring device starts working in an offline mode. The monitoring device can record and store the monitoring device data offline based on configuration settings of the monitoring device. In the offline mode, the monitoring device may not be able to generate alerts.

Figure 6:
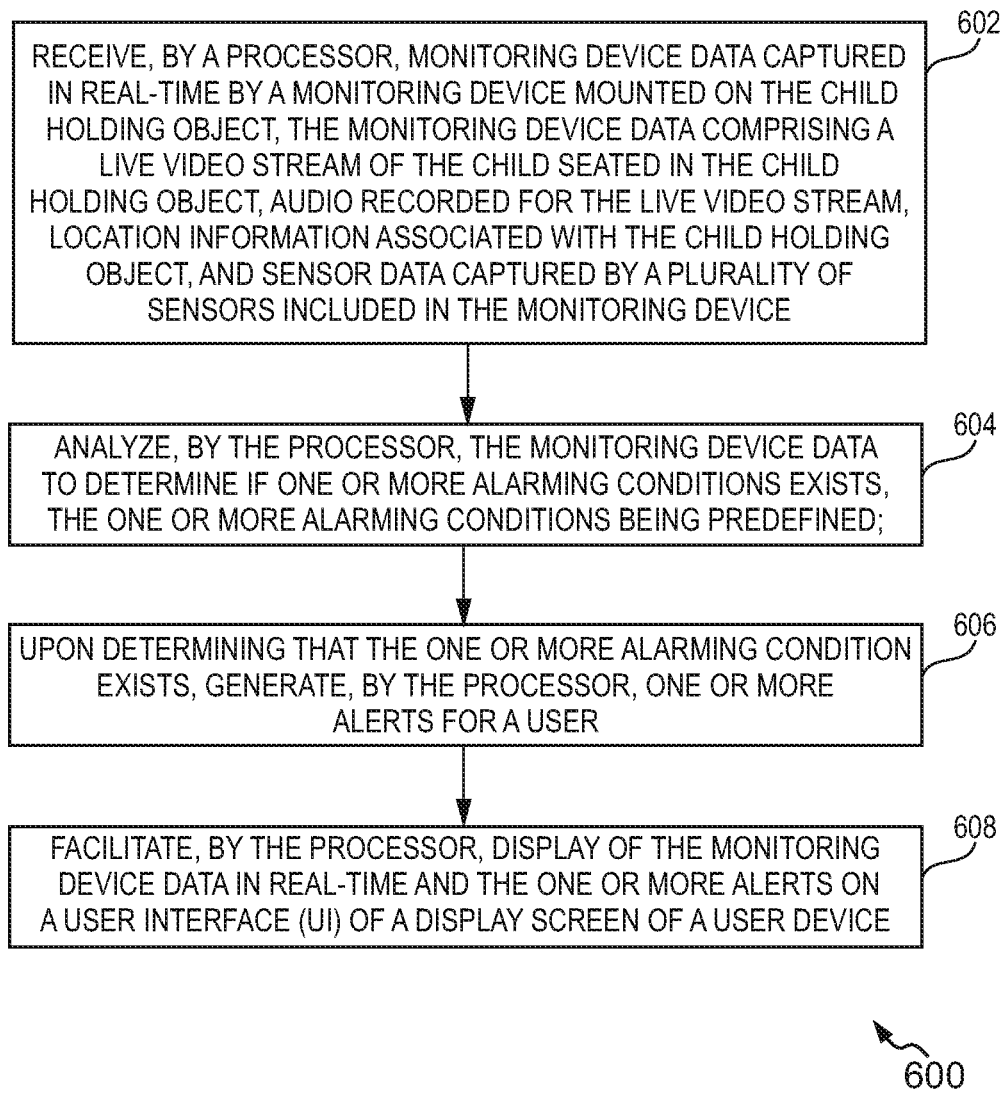
FIG. 6 is a flowchart illustrating a method for real-time monitoring of the child held in the child holding object, in accordance with an example embodiment.

FIG. 6 is a flowchart illustrating a method 600 for real-time monitoring of a child held in a child holding object, in accordance with an example embodiment. The operations of method 600 may be carried out by a server such as the server 112, the child monitoring system 200 or the electronic device 104. The sequence of operations of the method 600 may not be necessarily executed in the same order as they are presented. Further, one or more operations may be grouped together and performed in the form of a single step, or one operation may have several sub-steps that may be performed in parallel or in sequential manner.

At operation 602, the method 600 includes receiving, by a processor, a monitoring device data captured in real-time by a monitoring device (e.g., the monitoring device 118) mounted on a mounting space of a child holding object, such as a child safety seat and a stroller (e.g., the stroller 108). The monitoring device data includes a live video stream of a child (e.g., the child 106) recorded by a camera included in the monitoring device, audio recorded for the live video stream by a microphone included in the camera or the monitoring device, location information associated with the child holding object as captured by a GPS module included in the monitoring device, and sensor data captured by a plurality of sensors included in the monitoring device. The received monitoring device data may be further stored in a database (e.g., the database 116).

At operation 604, the method 600 includes analyzing, by the processor, the monitoring device data to determine if one or more alarming conditions exist. The one or more alarming conditions are predefined by an administrator of the child monitoring system 200. For example, when the monitoring device data is analyzed it is found that crying sound is observed in the audio and the position of the child is also not the same upon comparing video frames, so two alarming conditions are found to be existing in the received monitoring device data. Examples of the alarming conditions include, but are not limited to, the child holding object has left home geo-fence, the child holding object is in motion, the child is in the child holding object, the child is not in the child holding object, the child is crying, the child is sleeping and a change in position of the child held in child holding object.

At operation 606, the method 600 includes generating, by the processor, one or more alerts for the user upon determining that the one or more alarming condition exists. The one or more alerts are generated based upon type of alarming conditions. For the previous example, an alert for child is crying and another alert for child is not in sitting position are generated. The generated one or more alerts may be further stored in the database.

Figure 8A:
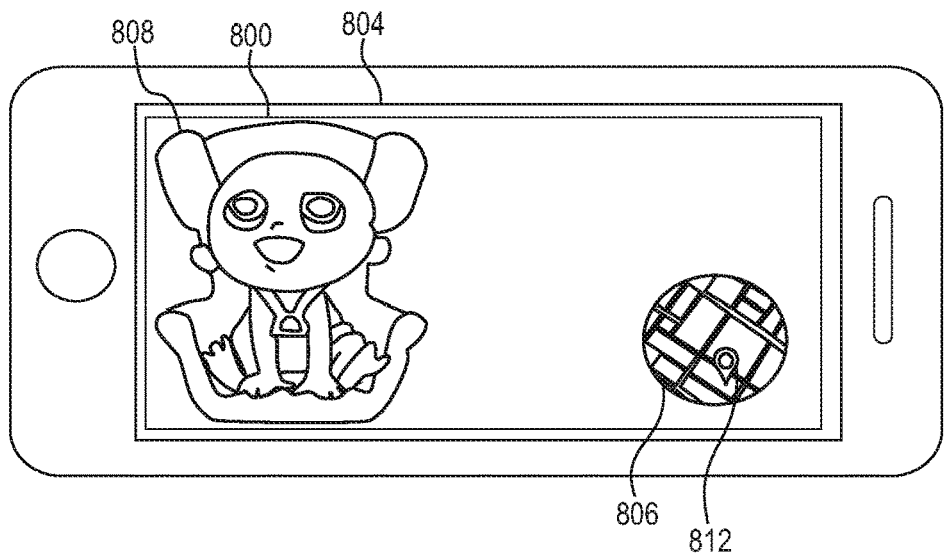
FIGS. 8A, 8B and 8C are simplified representations of a monitoring application presented at a caregiver device, in accordance with an example embodiment.
Figure 8B:
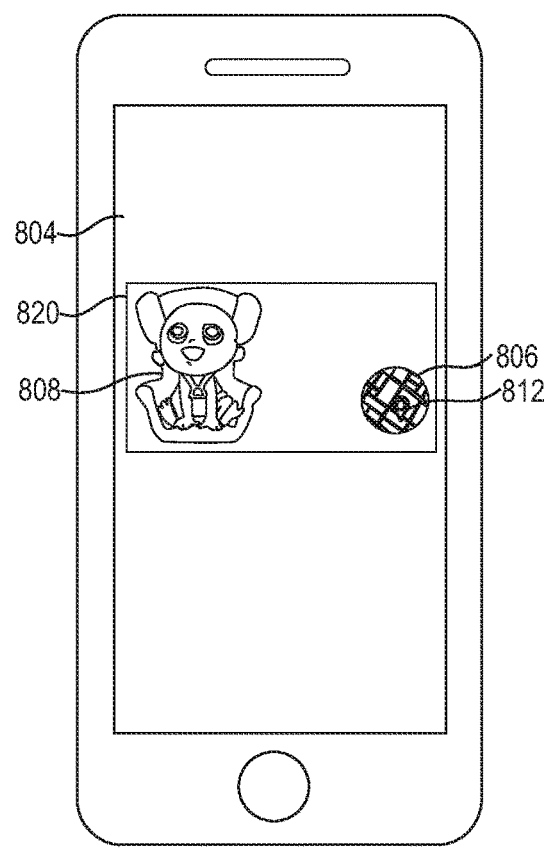
Figure 8C:
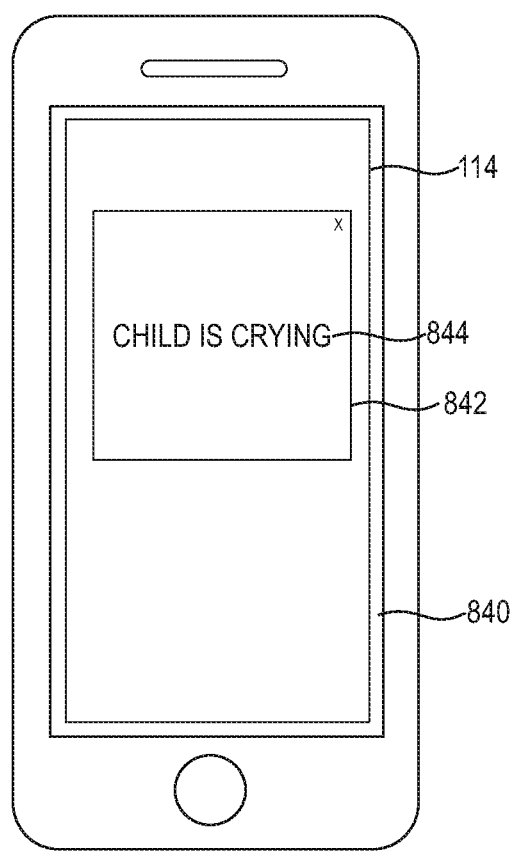

At operation 608, the method 600 includes facilitating, by the processor, display of the monitoring device data in real-time and the one or more alerts on a user interface (UI) of a display screen of a user device. The live video stream capturing activities of the child along with the audio and the current location information are displayed on the user device (e.g., the caregiver device 104). The one or more alerts, such as alert for child is crying and alert for child is not in sitting position are also displayed on the user device. The user may access the monitoring application installed on the user device for viewing the monitoring device data and the one or more alerts. Example UIs displayed to the user (e.g., the caregiver 102) for facilitating real-time monitoring and displaying the live video stream, location information and alerts are shown in FIGS. 8A, 8B and 8C.

Figure 7A:
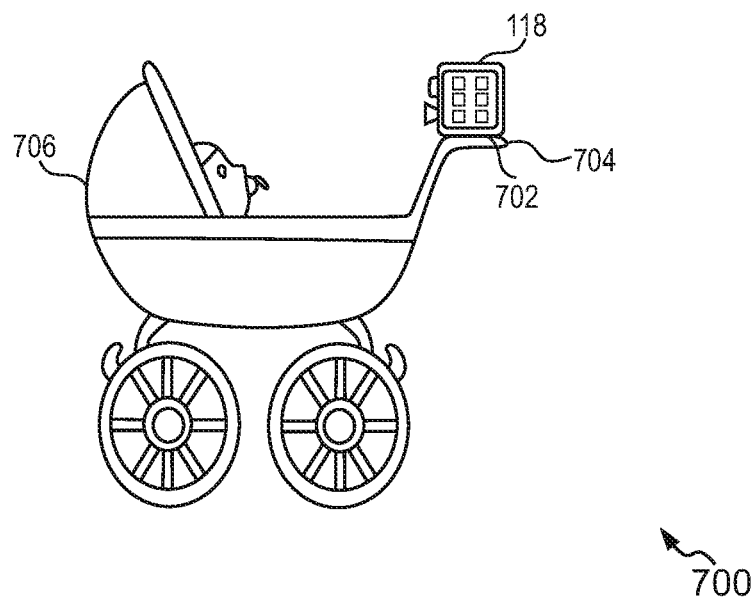
FIGS. 7A, 7B and 7C illustrate example representations of mounting the monitoring device in child holding object, such as a stroller or a child safety seat, in accordance with an example embodiment.
Figure 7B:
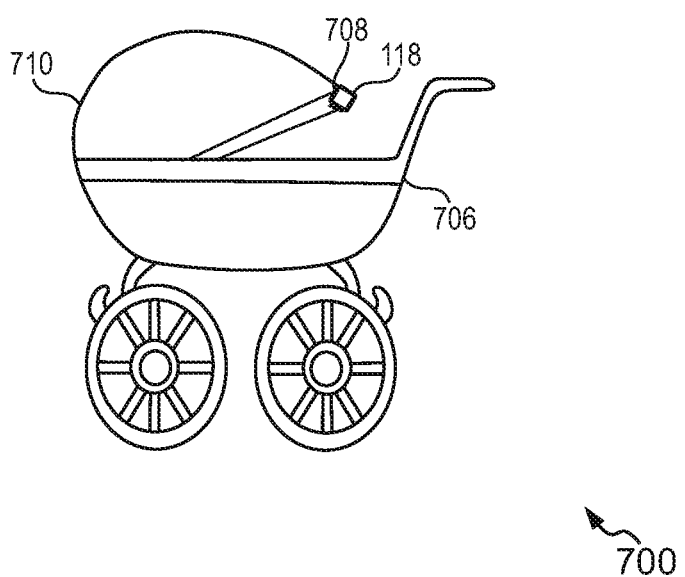
Figure 7C:
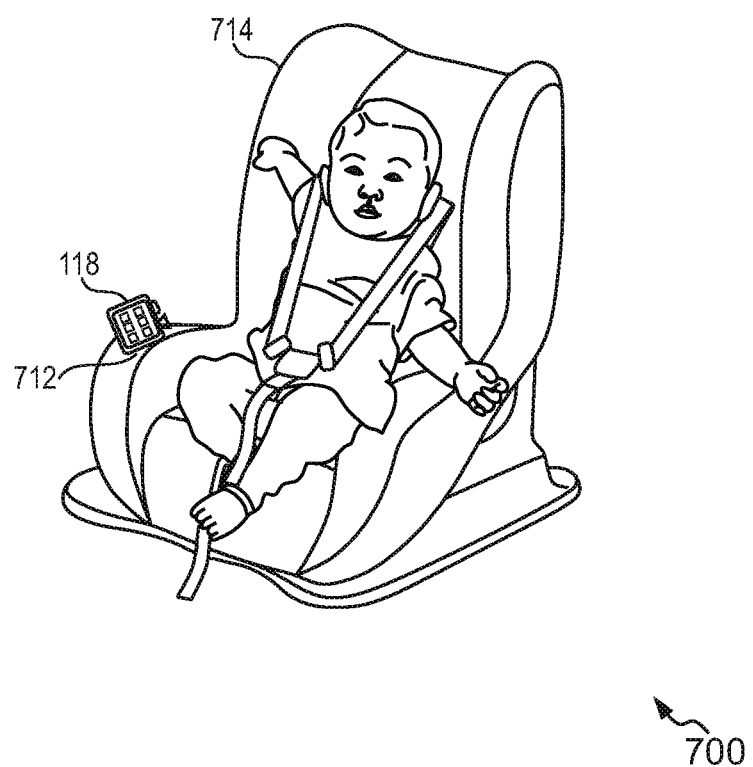

FIGS. 7A, 7B and 7C illustrate example representations of mounting the monitoring device 118 in child holding object, such as a stroller or a child safety seat, in accordance with an example embodiment. The monitoring device 118 is mounted on a mounting space provided at any portion of the child holding object using one or more clamps and one or more screws.

As seen in FIG. 7A, the monitoring device 118 is mounted on a mounting space 702 provided at a handle 704 of a stroller 706. The mounting space 702 can be provided in any portion of the stroller 706 such that the monitoring device 118 should get a view of the child held in the stroller.

As seen in FIG. 7B, the monitoring device 118 is mounted on a mounting space 708 provided at a sunshade 710 of the stroller 706. FIG. 7C depicts the monitoring device 118 mounted on a mounting space 712 provided at a child safety seat 714.

FIGS. 8A, 8B and 8C are simplified representations of a monitoring application presented at the caregiver device 104, in accordance with an example embodiment. The monitoring application is an example of the monitoring application 114 shown and explained with reference to FIG. 1. In an embodiment, the monitoring application 114 causes display of a live video stream and location information of the monitoring device 118 installed on the child holding object. In another embodiment, the monitoring application 114 causes display of alerts generated by the monitoring application 114. Example UIs displayed to the caregiver 102 for facilitating real-time monitoring of the child held in the child holding object are shown in FIGS. 8A, 8B and 8C.

Referring now to FIG. 8A, an example representation of a UI 800 displayed on a display screen 804 of the caregiver device 104 by the monitoring application 114 is illustrated, in accordance with an example embodiment. The monitoring application 114 as described in FIG. 8A is accessible by a user (e.g., the caregiver 102) on a user device (e.g., the caregiver device 104). Similarly, UIs 820 and 840 of the monitoring application 114 as described in the FIGS. 8B and 8C are accessible by the user on the user device.

The UI 800 illustrates display of a live video stream 808 on the display screen 804 in a landscape orientation. As shown in FIG. 8A, a portion of a map 806 is also displayed on the display screen 804 along with a place-mark 812. The place-mark 812 represents the exact location of the monitoring device 118 in the map 806.

Referring now to FIG. 8B, an example representation of a UI 820 displaying live video stream and location information of the monitoring device 118 mounted on the child holding object is illustrated, in accordance with an example embodiment. The UI 820 illustrates display of the live video stream 808 on the display screen 804 in a horizontal orientation. As shown in FIG. 8B, a portion of a map 806 is also displayed on the display screen 804 along with a place-mark 812. The place-mark 812 represents the exact location of the monitoring device 118 in the map 806.

Referring now to FIG. 8C, an example representation of a UI 840 displaying an alert generated by the monitoring application 114, is illustrated in accordance with an example embodiment. The UI 840 is presented on the monitoring application 114. The UI 840 presents a popup box 842 presenting a message 844 saying 'Child is crying'. After seeing the message 844, the user may get to know that the child held in the child holding object is crying and needs immediate attention.

Figure 9:
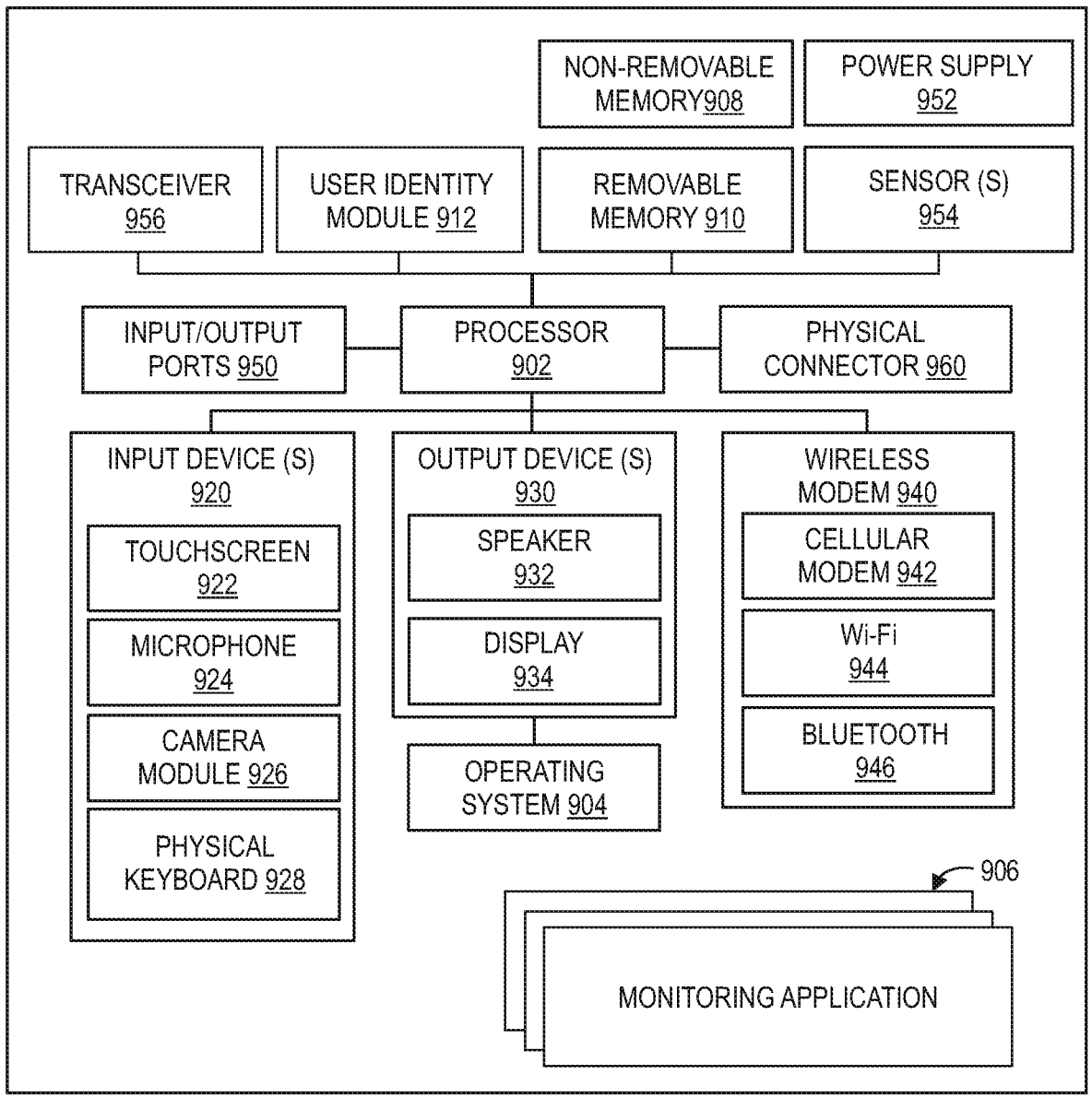
FIG. 9 is a block diagram of an electronic device capable of implementing the various embodiments of the present disclosure, in accordance with an example embodiment.

FIG. 9 shows a simplified block diagram of a mobile device 900, such as the caregiver device 104 explained with reference to FIG. 1. The mobile device 900, for example, can be a smartphone or a tablet computer capable of implementing the various embodiments of the present disclosure. The mobile device 900 is depicted to include a plurality of applications 906 including a monitoring application.

It should be understood that the mobile device 900 as illustrated and hereinafter described is merely illustrative of one type of device and should not be taken to limit the scope of the embodiments. As such, it should be appreciated that at least some of the components described below in connection with the mobile device 900 may be optional and thus in an example embodiment may include more, less or different components than those described in connection with the example embodiment of the FIG. 9. As such, among other examples, the mobile device 900 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated mobile device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the mobile device 900 and supports for one or more applications programs (for example, the monitoring application 114), that implement one or more of the innovative features described herein. The applications 906 may include common mobile computing applications (e.g., telephony applications, email applications, calendars, contact managers, web browsers, messaging applications such as USSD messaging or SMS messaging or SIM Tool Kit (STK) application) or any other computing application. The monitoring application is configured to be in operative communication with other applications for example, through the OS or using API Calls, for connecting with a monitoring device mounted on a child holding object. Moreover, the monitoring application communicates with the monitoring device to display live stream video, location information and generated alerts in substantial real-time. In at least one example embodiment, the monitoring application is configured to facilitate real-time monitoring of a child held in a child holding object using the monitoring device 118 mounted on the child holding object as explained with reference to FIGS. 1 to 8A-8C.

The illustrated mobile device 900 includes one or more memory components, for example, a non-removable memory 908 and/or a removable memory 910. The non-removable memory 908 and/or the removable memory 910 may be collectively known as database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. The mobile device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the mobile device 900 and a public switched telephone network (PSTN).

The mobile device 900 can further include one or more input/output ports 950, a power supply 952, one or more sensors 954 for example, an accelerometer, a gyroscope, a compass, or an infrared proximity sensor for detecting the orientation or motion of the mobile device 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 8A-8C, or one or more operations of the flow diagrams 500, 520, 540 and 560 and method 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 10 is a block diagram of a server system 1000, in accordance with an example embodiment. The server system 1000 is an example of the server 112 shown and explained with reference to FIG. 1. The server system 1000 includes a computer system 1002 and one or more databases, such as a database 1004.

The computer system 1002 includes a processor 1006 for executing instructions. Instructions may be stored in, for example, but not limited to, a memory 1008. The processor 1006 may include one or more processing units (e.g., in a multi-core configuration). The processor 1006 is operatively coupled to a communication interface 1010 such that the computer system 1002 is capable of communicating with a remote device such as an electronic device 1020. Some examples of the electronic device 1020 may include, but are not limited to, the monitoring device 118 and the caregiver device 104 shown in FIG. 1. The communication interface 1010 is further configured to receive the monitoring device data provided by the electronic device 1020. The communication interface 1010 is furthermore configured to provide the monitoring device data to the electronic device 1020.

The processor 1006 may also be operatively coupled to the database 1004 such as, but not limited to, plurality of applications. The database 1004 is configured to store the monitoring application 114 capable of displaying activities and location information associated with a child held in a child holding object using a monitoring device as explained with reference to FIGS. 1 to 8A-8C. The database 1004 is any computer-operated hardware suitable for storing and/or retrieving data. The database 1004 may include multiple storage units such as hard disks and/or solid-state disks in a redundant array of inexpensive disks (RAID) configuration. The database 1004 may include, but not limited to, a storage area network (SAN) and/or a network attached storage (NAS) system.

In some embodiments, the database 1004 is integrated within the computer system 1002. For example, the computer system 1002 may include one or more hard disk drives as the database 1004. In other embodiments, the database 1004 is external to the computer system 1002 and may be accessed by the computer system 1002 using a storage interface 1012. The storage interface 1012 is any component capable of providing the processor 1006 with access to the database 1004. The storage interface 1012 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1006 with access to the database 1004.

The memory 1008 is a storage device embodied as one or more volatile memory devices, one or more non-volatile memory devices, and/or a combination of one or more volatile memory devices and non-volatile memory devices, for storing micro-contents information and instructions. The memory 1008 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-Ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing a method and a system for real-time monitoring of a child held in a child holding object. The child monitoring system helps in displaying activities of a child held in the child holding object in real-time, thereby enabling the caregiver to perform other tasks without worrying about the security of the child. Further, the child monitoring system generates alerts based on the activities performed by the child, thereby ensuring safety of the child. The child monitoring system is equipped with an in-built modem device which helps in providing cellular connection wherever the monitoring device goes, thereby eliminating dependence of home Wi-Fi network and the child can be monitored from anywhere regardless of the location. So, now the caregiver can take the child on a stroll, to the park, out for shopping without worrying about the security of the child. The use of child monitoring system is not limited to child holding object, it can also be used in car bases, harnesses, cribs, crib mattresses, play pens, and bassinets.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application/or implementation without departing from the spirit or scope of the claims.

What is claimed is:

1. A child monitoring system, comprising:
a child holding object configured to hold a child, the child holding object comprising amounting space therein; and
a monitoring device configured to be mounted on the mounting space, the monitoring device comprising:
  a mobile camera for capturing and transmitting a live video stream to continuously track and monitor activities of the child held in the child holding object;
  a modem device for enabling communication between the monitoring device and at least one user device over a network;
  a global positioning system (GPS) module for determining location information of the monitoring device mounted on the child holding object by determining GPS coordinates of the monitoring device;
  a plurality of sensors for detecting change in position of the child seated in the child holding object; and
  a monitoring application in communication with the monitoring device including one or more modes of operation and launching a particular mode of operation from available modes of operation based on a context in which a request to launch the monitoring application is received, wherein the available modes of operation are an init mode, an entry mode, a relay mode, and an exit mode, and wherein, the init mode is launched when connecting the monitoring application with the monitoring device for the first time, the entry mode connects with the monitoring application to transmit location information and to initiate live video streaming, in the relay mode, the monitoring application enables the user to adjust settings of the video stream and in the exit mode, the connection between the monitoring device and the monitoring application is released based on received user input and starts recording in offline mode.

2. The child monitoring system as claimed in claim 1, wherein the monitoring device further comprises:
a microphone for recording audio associated with the live video stream; and a wireless chargeable battery for powering the monitoring device.

3. The child monitoring system as claimed in claim 2, wherein the wireless chargeable battery uses at least one of an inductive charging, a magnetic resonance charging, a radio frequency charging or an ultrasonic sound wave charging for wirelessly charging the wireless chargeable battery.

4. The child monitoring system as claimed in claim 2, further comprises:
a processing module in communication with the monitoring device, wherein the
  processing module is configured to store and analyse monitoring device data received from the monitoring device, to generate one or more alerts based on results of analysis performed on the monitoring device data and to communicate information about generation of the one or more alerts to a monitoring application;
the monitoring application installed on the at least one user device, wherein the monitoring application is configured to display at least one of the live video stream captured by the mobile camera along with the audio captured for the live video stream, the location information determined by the GPS module, a history information of the monitoring device, and the one or more alerts generated by the processing module; and
a database configured to store the monitoring device data received from the monitoring device.

5. The child monitoring system as claimed in claim 4, wherein the monitoring device data includes at least one of:
the live video stream captured by the mobile camera;
the audio recorded for the live video stream;
the location information determined by the GPS module;
and sensor data provided by the plurality of sensors.

6. The child monitoring system as claimed in claim 4, wherein the history information of the monitoring device includes at least one of:
the information about the one or more alerts generated in past;
saved one or more live video streams; and
saved location information.

7. The child monitoring system as claimed in claim 4, wherein the monitoring application is further caused to display the location information determined by the GPS module on a map.

8. The child monitoring system as claimed in claim 1, wherein the monitoring device is mounted on the mounting space of the child holding object using one or more clamps and one or more screws.

9. The child monitoring system as claimed in claim 1, wherein the child holding object is a child safety seat.

10. A child monitoring system, comprising:
a stroller configured to carry a child, the stroller comprising a mounting space therein; and
a monitoring device configured to be mounted on the mounting space, the monitoring device comprising:
  a mobile camera for capturing and transmitting a live video stream to continuously track and monitor activities of the child carried in the stroller;
  a modem device for enabling communication between the monitoring device and at least one user device over a network;
  a global positioning system (GPS) module for determining location information of the monitoring device mounted on the stroller by determining GPS coordinates of the monitoring device;

a plurality of sensors for detecting change in position of the child seated in the stroller; and a monitoring application in communication with the monitoring device including one or more modes of operation and launching a particular mode of operation from available modes of operation based on a context in which a request to launch the monitoring application is received wherein the available modes of operation are an init mode, an entry mode, a relay mode, and an exit mode, and wherein, the init mode is launched when connecting the monitoring application with the monitoring device for the first time, the entry mode connects with the monitoring application to transmit location information and to initiate live video streaming, in the relay mode, the monitoring application enables the user to adjust settings of the video stream and in the exit mode, the connection between the monitoring device and the monitoring application is released based on received user input and starts recording in offline mode.

11. The child monitoring system as claimed in claim 10, wherein the monitoring device further comprises:

a microphone for recording audio associated with the live video stream; and a wireless chargeable battery for powering the monitoring device.

12. The child monitoring system as claimed in claim 11, wherein the wireless chargeable battery uses at least one of an inductive charging, a magnetic resonance charging, a radio frequency charging or an ultrasonic sound wave charging for wirelessly charging the wireless chargeable battery.

13. The child monitoring system as claimed in claim 11, further comprises:

a processing module in communication with the monitoring device, wherein the processing module is configured to store and analyse monitoring device data received from the monitoring device, to generate one or more alerts based on results of analysis performed on the monitoring device data and to communicate information about generation of the one or more alerts to a monitoring application;

the monitoring application installed on the at least one user device, wherein the monitoring application is configured to display at least one of the live video stream captured by the mobile camera along with the audio captured for the live video stream, the location information determined by the GPS module, a history information of the monitoring device, and the one or more alerts generated by the processing module; and a database configured to store the monitoring device data received from the monitoring device.

14. The child monitoring system as claimed in claim 13, wherein the monitoring device data includes at least one of:
the live video stream captured by the mobile camera;
the audio recorded for the live video stream;
the location information determined by the GPS module; and
sensor data provided by the plurality of sensors.

15. The child monitoring system as claimed in claim 13, wherein the history information of the monitoring device includes at least one of:

information about the one or more alerts generated in past;
saved one or more live video streams; and
saved location information.

16. The child monitoring system as claimed in claim 13, wherein the monitoring application is further caused to display the location information determined by the GPS module on a map.

17. The child monitoring system as claimed in claim 10, wherein the monitoring device is mounted on the mounting space of the stroller using one or more clamps and one or more screws.

18. A method for real-time monitoring of a child held in a child holding object, comprising:

communicating, by a processor, with the monitoring device through a monitoring application including one or more modes of operation and launching a particular mode of operation from available modes of operation based on a context in which a request to launch the monitoring application is received, wherein the available modes are an init mode, an entry mode, a relay mode, and an exit mode, and wherein, the init mode is launched when connecting the monitoring application with the monitoring device for the first time, the entry mode connects with the monitoring application to transmit location information and to initiate live video streaming, in the relay mode, the monitoring application enables the user to adjust settings of the video stream and in the exit mode, the connection between the monitoring device and the monitoring application is released based on received user input and starts recording in offline mode;

receiving, by a processor, monitoring device data captured in real-time by a monitoring device mounted on the child holding object, the monitoring device data comprising a live video stream of the child held in the child holding object, audio recorded for the live video stream, location information associated with the child holding object, and sensor data captured by a plurality of sensors included in the monitoring device;

analysing, by the processor, the monitoring device data to determine if one or more alarming conditions exist, the one or more alarming conditions being predefined;

upon determining that the one or more alarming condition exists, generating, by the processor, one or more alerts for a user; and facilitating, by the processor, display of the monitoring device data in real-time and the one or more alerts on a user interface (UI) of a display screen of a user device.

19. The method as claimed in claim 18, further comprising:

facilitating, by the processor, access of a monitoring application installed on the user device for facilitating viewing of the monitoring device data and the one or more alerts.

20. The method as claimed in claim 18, further comprising:

storing, by the processor, the monitoring device data and the one or more generated alerts in a database.

\* \* \* \* \*